US012755723B2

(12) United States Patent
Hasebe

(10) Patent No.: US 12,755,723 B2
(45) Date of Patent: Oct. 6, 2026

(54) SIGNAL GENERATION METHOD, SIGNAL GENERATION SYSTEM, ELECTRONIC MUSICAL INSTRUMENT, AND RECORDING MEDIUM

(71) Applicant: Yamaha Corporation, Hamamatsu (JP)

(72) Inventor: Masahiko Hasebe, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 959 days.

(21) Appl. No.: 18/077,671

(22) Filed: Dec. 8, 2022

(65) Prior Publication Data

US 2023/0186886 A1 Jun. 15, 2023

(30) Foreign Application Priority Data

Dec. 9, 2021 (JP) ................................ 2021-199900

(51) Int. Cl.

| | |
|---|---|
| ***G10H 7/00*** | (2006.01) |
| ***G10H 1/00*** | (2006.01) |
| ***G10H 1/34*** | (2006.01) |

(52) U.S. Cl.

CPC ........... *G10H 7/008* (2013.01); *G10H 1/0008* (2013.01); *G10H 1/344* (2013.01); *G10H 2220/221* (2013.01); *G10H 2220/275* (2013.01)

(58) Field of Classification Search

CPC ...... G10H 7/008; G10H 1/0008; G10H 1/344; G10H 2220/221; G10H 2220/275

USPC ............................................................ 84/609

See application file for complete search history.

(56) References Cited

U.S. PATENT DOCUMENTS 5,403,971 A * 4/1995 Aoki ...................... G10H 7/008 84/626
2021/0151020 A1 5/2021 Tanoue et al.

FOREIGN PATENT DOCUMENTS

| | | | |
|---|---|---|---|
| EP | 1 729 283 | A1 | 12/2006 |
| JP | 59-139095 | A | 8/1984 |
| JP | 2004-361528 | A | 12/2004 |
| JP | 2007-199109 | A | 8/2007 |
| JP | 2021-56315 | A | 4/2021 |
| JP | 2021-81615 | A | 5/2021 |

OTHER PUBLICATIONS

Japanese-language Office Action issued in Japanese Application No. 2021-199900 dated Aug. 19, 2025 with English translation (11 pages).
Extended European Search Report issued in European Application No. 22211134.6 dated May 2, 2023 (8 pages).
Chinese-language Office Action issued in Chinese Application No. 202211518915.2 dated Apr. 18, 2025 with English translation (16 pages).

* cited by examiner

*Primary Examiner* — Jianchun Qin
(74) *Attorney, Agent, or Firm* — Crowell & Moring LLP

(57) ABSTRACT

A signal generation method implemented by a computer system includes: generating an audio signal in response to a manipulation of each of a first key and a second key; and controlling generation of the audio signal based on a reference point that is a position of the first key at a time point of a manipulation of the second key, based on the second key being manipulated during a manipulation of the first key.

20 Claims, 10 Drawing Sheets

SIGNAL GENERATION METHOD, SIGNAL GENERATION SYSTEM, ELECTRONIC MUSICAL INSTRUMENT, AND RECORDING MEDIUM

CROSS REFERENCE TO RELATED APPLICATION

This Application claims priority from Japanese Patent Application No. 2021-199900, which was filed on Dec. 9, 2021, and the entire contents of which is incorporated herein by reference.

BACKGROUND

Field of the Invention

This disclosure relates to techniques for generating audio signals in response to user manipulations.

Description of Related Art

A variety of techniques have been proposed for detecting amounts of manipulations of, for example, keys, included in a musical keyboard instrument. Patent document 1 (e.g., Japanese Patent Application Laid-Open No. 2021-56315) discloses that strain sensors are used to detect depressions of keys. Patent Document 2 (e.g., Japanese Patent Application Laid-Open No. 2021-81615) discloses that positions of keys are detected based on change in magnetic fields generated in response to depression or release of the keys.

Techniques have been desired to generate audio signals with a variety of audio characteristics based on user manipulations of operational elements, such as keys.

SUMMARY

In view of the circumstances described above, an object of one aspect of this disclosure is to generate audio signals with a variety of audio characteristics based on user manipulations simply.

To achieve the above-stated object, a signal generation method according to an aspect of this disclosure is a signal generation method implemented by a computer system, the signal generation method including: generating an audio signal in response to a manipulation of each of a first key and a second key; and controlling generation of the audio signal based on a reference point that is a position of the first key at a time point of a manipulation of the second key, based on the second key being manipulated during a manipulation of the first key.

A signal generation system according to an aspect of this disclosure includes: at least one memory configured to store instructions; and at least one processor configured to implement the instructions to: generate an audio signal in response to a manipulation of each of a first key and a second key; and control generation of the audio signal based on a reference point that is a position of the first key at a time point of a manipulation of the second key, based on the second key being manipulated during a manipulation of the first key.

An electronic musical instrument according to an aspect of this disclosure includes: a first key; a second key; a detection system configured to detect a manipulation of each of the first and second keys; and a signal generation system: in which the signal generation system includes: at least one memory configured to store instructions; and at least one processor configured to implement the instructions to: generate an audio signal in response to a manipulation of each of a first key and a second key; and control generation of the audio signal based on a reference point that is a position of the first key at a time point of a manipulation of the second key, based on the second key being manipulated during a manipulation of the first key.

A recording medium according to an aspect of this disclosure is a non-transitory computer-readable recording medium storing a program executable by a computer system to execute a method including: generating an audio signal in response to a manipulation of each of a first key and a second key; and controlling generation of the audio signal based on a reference point that is a position of the first key at a time point of a manipulation of the second key, based on the second key being manipulated during a manipulation of the first key.

DESCRIPTION OF EMBODIMENTS

A: First Embodiment

Figure 1:
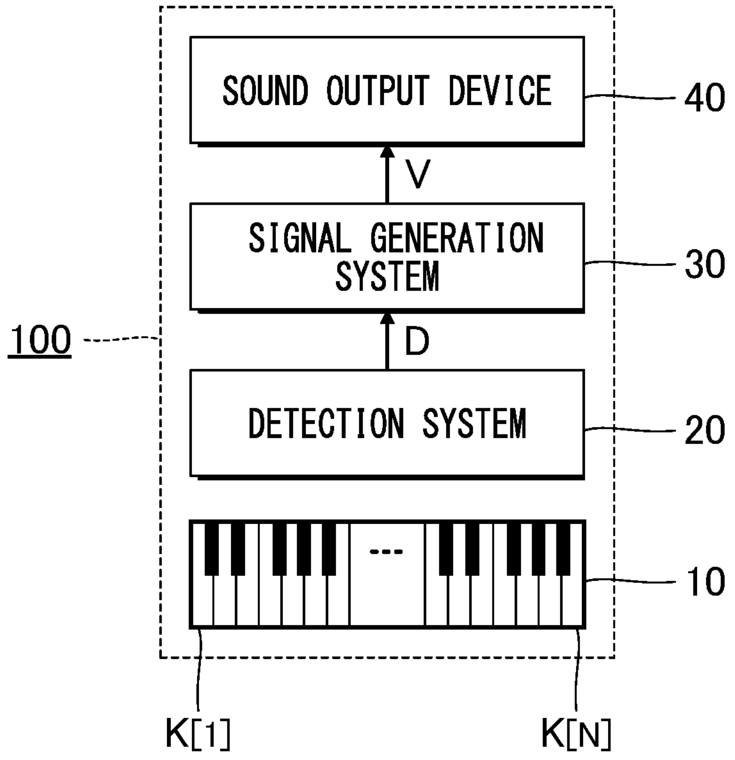
FIG. 1 is a block diagram showing a configuration of an electronic musical instrument according to a first embodiment.

FIG. 1 is a block diagram showing a configuration of an electronic musical instrument 100 according to the first embodiment. The electronic musical instrument 100 outputs sound in response to a user performance, and it includes keyboard 10, a detection system 20, a signal generation system 30, and a sound output device 40. The electronic musical instrument 100 may be configured not only as a single device but also as multiple separate devices.

The keyboard 10 includes N keys K[1] to K[N], each of which corresponds to a different pitch P[n] (n=1 to N). "N" is a natural number that is 2 or greater. The N keys K[1] to K[N] include white keys and multiple black keys, and they are arranged in the predetermined direction. Each key K[n] is an operational element that is vertically displaceable in response to a user manipulation, which is used for a musical performance and involves depression or release of the key.

The detection system 20 detects a user manipulation of each key K[n]. The signal generation system 30 generates an audio signal V in response to a user manipulation of each key K[n]. The audio signal V is a time signal representing sound with a pitch P[n] of the key K[n] manipulated by the user.

The sound output device 40 outputs sound represented by the audio signal V. Examples of the sound output device 40 include a speaker and a headphone set. The sound output device 40 may be independent from the electronic musical instrument 100, and the independent sound output device 40 may be wired to or be wirelessly connected to the electronic musical instrument 100. Devices, such as a D/A converter that converts a digital audio signal V to analog thereof, and an amplifier that amplifies an audio signal V, are not shown in the drawings for convenience.

Figure 2:
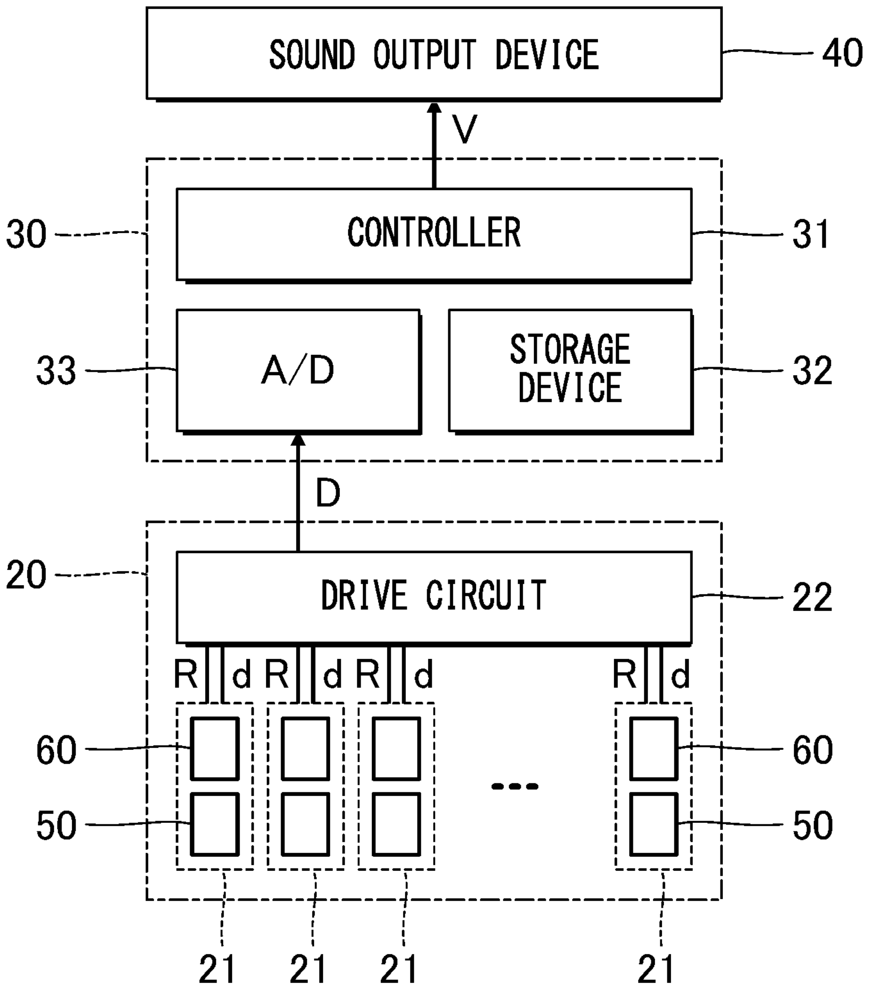
FIG. 2 is a block diagram showing an example of configurations of a detection system and a signal generation system.

FIG. 2 is a block diagram showing an example of configurations of the detection system 20 and the signal generation system 30. The detection system 20 includes N magnetic sensors 21 corresponding to the respective keys K[n], and a drive circuit 22 that controls each of the N magnetic sensors 21. One magnetic sensor 21 corresponding to one key K[n] detects a vertical position Z[n] of the key K[n]. Each of the N magnetic sensors 21 includes a detection circuit 50 and a detectable portion 60, which means that one set of the detection circuit 50 and the detectable portion 60 is disposed for one key K[n].

A detectable portion 60 is disposed on a corresponding key K[n], and moves vertically in conjunction with the user manipulation of the key K[n]. The detection circuit 50 is disposed within the housing of the electronic musical instrument 100, which means that the position of the detection circuit 50 does not correspond to the user manipulation of the key K[n]. The distance between the detection circuit 50 and the detectable portion 60 changes in conjunction with the user manipulation of the key K[n].

Figure 3:
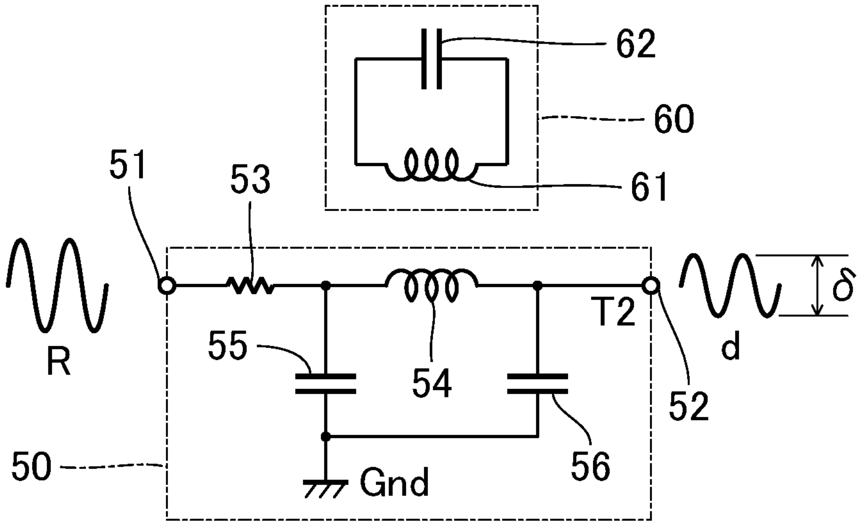
FIG. 3 is a circuit diagram showing an example of configurations of a detection circuit and a detectable portion.

FIG. 3 is a circuit diagram showing an example of configurations of a detection circuit 50 and a detectable portion 60. The detection circuit 50 is a resonant circuit that includes an input terminal 51, an output terminal 52, a resistance 53, a coil 54, a capacitor 55, and a capacitor 56. A first end of the resistance 53 is connected to the input terminal 51, and a second end of the resistance 53 is connected to both a first end of the capacitor 55 and a first end of the coil 54. A second end of the coil 54 is connected to both the output terminal 52 and a first end of the capacitor 56. A second end of the capacitor 55 and a second end of the capacitor 56 are grounded.

The detectable portion 60 is a resonant circuit including a coil 61 and a capacitor 62. A first end of the capacitor 62 is connected to a first end of the coil 61. A second end of the capacitor 62 is connected to a second end of the coil 61. The detection circuit 50 has the same resonance frequency as that of the detectable portion 60, but detection circuit 50 may have a different frequency as that of the detectable portion 60.

The coils 54 and 61 of a corresponding key K[n] oppose each other and are vertically spaced apart from each other. The distance between the coils 54 and 61 changes in response to a user manipulation of the key K[n]. Specifically, depression of the key decreases the distance between the coils 54 and 61, and release of the key increases the distance between them.

The drive circuit 22 shown in FIG. 2 supplies the detection circuits 50 with the respective reference signals R. Specifically, the reference signals R are supplied to the respective detection circuits 50 by time division. Each of the reference signals R is a cyclic signal the level of which fluctuates with a predetermined frequency, and it is supplied to a corresponding input terminal 51 of each detection circuit 50. In one example, the frequency of each reference signal R is set to the resonance frequency of the corresponding detection circuit 50 or detectable portion 60.

As will be apparent from FIG. 3, a reference signal R is supplied to the coil 54 via the input terminal 51 and the resistance 53. The supply of the reference signal R causes a magnetic field in the coil 54, and thus the generated magnetic field causes electromagnetic induction in the coil 54. As a result, an induction current is generated in the coil 61 of the detectable portion 60. The magnetic field generated in the coil 61 changes depending on the distance between the coils 54 and 61. From the output terminal 52 of the detection circuit 50, a detection signal d with an amplitude δ based on the distance between the coils 54 and 61 is output. That is, the amplitude δ of the detection signal d changes depending on the vertical position Z[n] of the key K[n].

The drive circuit 22 shown in FIG. 2 generates a detection signal D based on detection signals d output from the detection circuits 50. The detection signal D changes depending on each detection signal d with time and has a level with the amplitude δ of each detection signal d. The amplitude δ changes depending on the position Z[n] of the key K[n]. In light of this, the detection signal D represents the vertical position Z[n] of each of the N keys K[1] to K[N]. In one example, the position Z[n] refers to the position of the top surface of a corresponding key K[n], and the top surface comes in contact with the user's finger.

As shown in FIG. 2, the signal generation system 30 includes a controller 31, a storage device 32 and an A/D converter 33. The signal generation system 30 may be configured by a single device or it may be configured by multiple devices independent from each other. The A/D converter 33 converts an analog detection signal D to a digital thereof.

The controller 31 is composed of one or more processors that control each element of the electronic musical instrument 100. Specifically, the controller 31 comprises one or more types of processors, such as a Central Processing Unit (CPU), a Graphics Processing Unit (GPU), a Sound Processing Unit (SPU), a Digital Signal Processor (DSP), a Field Programmable Gate Array (FPGA), or an Application Specific Integrated Circuit (ASIC). The controller 31 generates an audio signal V based on the detection signal D converted by the A/D converter 33.

The storage device 32 comprises one or more memory devices that store programs implemented by the controller 31 and data used by the controller 31. Examples of application of the storage device 32 include a known recording medium, such as a magnetic recording medium or a semiconductor recording medium, and a combination of some types of recording mediums. Other examples of application of the storage device 32 include a portable recording medium that is attached to and is detached from the electronic musical instrument 100, and a recording medium (e.g., cloud storage) that is written or read by the controller 31 via a communication network.

In the first embodiment, the storage device 32 stores waveform signals W[n] corresponding to the respective keys K[n]. A waveform signal W[n] corresponding to one key K[n] represents sound with a pitch P[n] of the key K[n]. The waveform signal W[n], which is as an audio signal V, is supplied to the sound output device 40, to produce sound with the pitch P[n]. The data format of the waveform signal W[n] may be freely selected.

Figure 4:
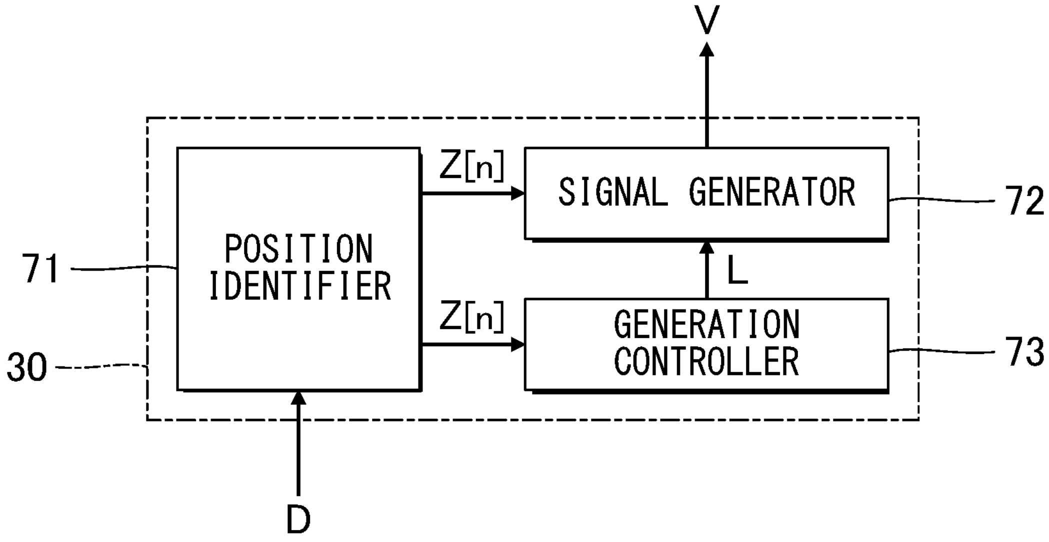
FIG. 4 is a block diagram showing a functional configuration of a controller.

FIG. 4 is a block diagram showing a functional configuration of the controller 31. The controller 31 executes the program in the storage device 32 to implement multiple functions (position identifier 71, signal generator 72 and generation controller 73) for generating an audio signal V based on the detection signal D.

By analyzing the detection signal D, the position identifier 71 identifies the position Z[n] of each of the N keys K[1] to K[N]. Specifically, the detection signal D includes signal levels of respective N keys. The position identifier 71 identifies the position Z[n] of each of the N keys based on the signal level of the corresponding key K[n].

Figure 5:
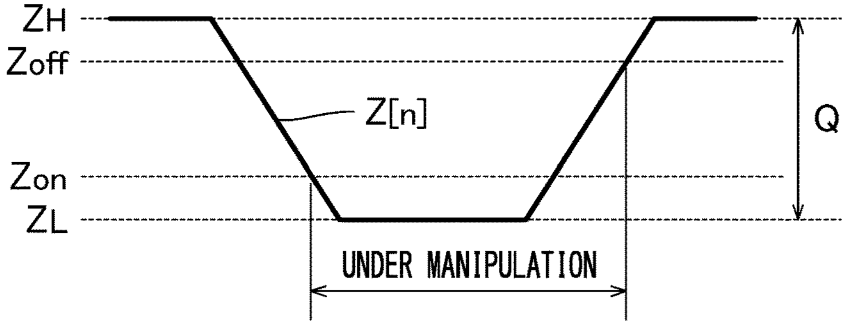
FIG. 5 is an explanatory diagram for the position of a key.

FIG. 5 is an explanatory diagram for the position Z[n] of a key K[n]. As shown in FIG. 5, the key K[n] moves vertically in response to a user manipulation within the range Q from the upper end position ZH to the lower end position ZL (hereafter, "movable range"). The upper end position ZH is a position of the key K[n] with no user manipulation, that is, the top of the movable range Q. On the other hand, the lower end position ZL is a position of the key K[n] under a sufficient depression, that is, the bottom of the movable range Q. The lower end position ZL is also called as a position of the key K[n] when the displacement of the key K[k] is maximum. The detection system 20 according to the first embodiment is detectable for the position of each key K[n] over the entire movable range Q. The position Z[n] indicated by a detection signal D for each key K[n] is any one point within the entire movable range Q. The upper end position ZH is an example of a "first end position." The lower end position ZL is an example of a "second end position."

Within the movable range Q, a manipulation position Zon and a release position Zoff are set. The manipulation position Zon refers to a position at which it is determined that the key K[n] has been manipulated by the user. Specifically, when, in response to depression of the key K[n], its position Z[n] drops to reach the manipulation position Zon, it is determined that the key K[n] has been manipulated. In contrast, the release position Zoff refers to a position at which it is determined that a manipulation of the key K[n] has been released. Specifically, when, in response to release of the depressed key K[n], its position Z[n] rises to reach the release position Zoff, it is determined that the key K[n] has been released. The manipulation position Zon is between the release position Zoff and the lower end position ZL.

The manipulation position Zon may be identical to the upper end position ZH or the lower end position ZL. Similarly, the release position Zoff may be identical to the upper end position ZH or the lower end position ZL. The release position Zoff may be between the manipulation position Zon and the lower end position ZL.

In response to receiving a user manipulation, the key K[n] drops from the upper end position ZH to reach the lower end position ZL, passing through the manipulation position Zon. In response to release of the depressed key K[n], the key K[n] rises from the lower end position ZL to reach the upper end position ZH, passing through the release position Zoff.

The signal generator 72 shown in FIG. 4 generates an audio signal V in response to a user manipulation made to each of the keys K[n]. That is, the signal generator 72 generates an audio signal V based on the position Z[n] of each key K[n].

First, description is given in which any single key K[n] of the keyboard 10 is manipulated independently. In this case, the signal generator 72 generates an audio signal V using a waveform signal W[n] that corresponds to the key K[n] among the N waveform signals W[1] to W[N] stored in the storage device 32. Specifically, when, in response to depression of the key K[n], its position Z[n] drops to reach the manipulation position Zon, the signal generator 72 outputs the waveform signal W[n], which is as an audio signal V, to the sound output device 40. Sound with the pitch P[n] is produced by the sound output device 40. It is of note that the audio signal V may be generated by performing various acoustic processing on the waveform signal W[n]. As will be apparent from this description, the signal generator 72 is a Pulse Code Modulation (PCM) sound source.

Next, description is given in which a key K[n2] is manipulated during a manipulation of another key K[n1] (hereafter, "continuous manipulation"). The key K[n1] (n1=1 to N) is any key K[n] of the N keys K[1] to K[N]. The key K[n2] (n2=1 to N, and n2≠n1) is any key K[n] of the N keys K[1] to K[N], except for the key K[n1]. The keys K[n1] and K[n2] may be two keys K[n] adjacent to each other, or they may be two keys K[n] apart from each other by at least one key K[n]. The key K[n2] corresponds to a pitch P[n2] that is different from the pitch P[n1].

As shown in FIG. 5, the term "during the manipulation of the key K[n1]" refers to a period from a time at which after the Key K[n1] begins to fall, it passes through the manipulation position Zon, to a time at which the fallen key K[n1] turns to rise to pass through the release position Zoff. This period is referred to as "manipulation period." In continuous manipulation, a manipulation period of the key K[n1] and a manipulation period of the key K[n2] overlap each other on the time axis. Specifically, the manipulation period of the key K[n1] includes an end period with the end, and the manipulation period of the key K[n2] includes a start period with the start point. The end and start periods overlap each other.

When the key K[n2] is manipulated during the manipulation of the key K[n1], the signal generator 72 generates an audio signal V using a waveform signal W[n1] corresponding to the key K[n1] and a waveform signal W[n2] corresponding to the key K[n2]. Here, the Key K[n1] is an example of "first key." The key K[n2] is an example of "second key." The waveform signal W[n1] is an example of "first waveform signal." The waveform signal W[n2] is an example of "second waveform signal."

Figure 6:
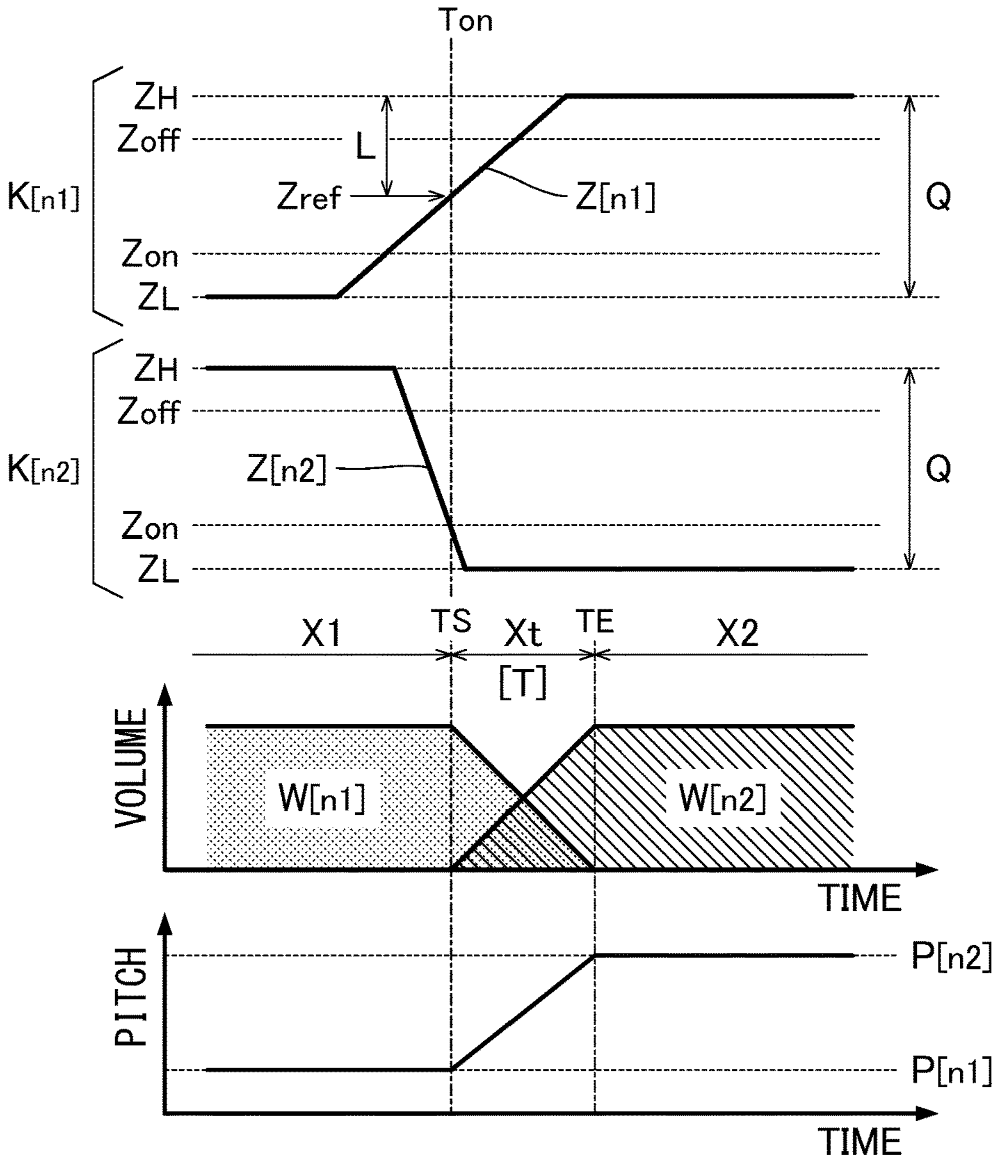
FIG. 6 shows actions of a signal generator during a continuous manipulation.

FIG. 6 shows actions of the signal generator 72 during a continuous manipulation. As shown in FIG. 6, description is given of an continuous manipulation, that is, a case in which the key K[n2] is manipulated while the key K[n1] rises in response to release of the key K[n1].

In such a situation, the signal generator 72 generates an audio signal V that includes a first interval X1, a second interval X2 and a transition interval Xt. In the first interval X1, the key K[n1] is manipulated. In the second interval X2, the key K[n2] is manipulated. The second interval X2 comes after the first interval X1 on the time axis. The transition interval Xt is between the first interval X1 and the second interval X2.

The start point TS of the transition interval Xt corresponds to a time point Ton of the manipulation of the key K[n2]. Specifically, the start point TS corresponds to the time point Ton at which, in response to depression of the key K[n2], its position Z[n2] reaches the manipulation position Zon. The end point TE of the transition interval Xt comes after the time length T passed from the start point TS thereof. The time length T will be described below. The start point TS is also called "the end point of the first interval X1." The end point TE is also called "the start point of the second interval X2."

The signal generator 72 supplies the sound output device 40 with a waveform signal W[n1] that corresponds to the key K[n1] in response to the first interval X1 within the audio signal V. As a result, sound with the pitch P[n1] (hereafter, "first sound") is produced by the sound output device 40. The first interval X1 within the audio signal V represents the first sound with the pitch P[n1] of the key K[n1].

The signal generator 72 supplies the sound output device 40 with a waveform signal W[n2] that corresponds to the key K[n2] in response to the second interval X2 within the audio signal V. As a result, sound with the pitch P[n2] (hereafter, "second sound") is produced by the sound output device 40. The second interval X2 within the audio signal V represents the second sound with the pitch P[n2] of the key K[n2]. The pitch P[n1] of the first sound within the first interval X1 differs from the pitch P[n2] of the second sound within the second interval X2. In FIG. 6, an example is given in which the pitch P[n2] exceeds the pitch P[n1] for convenience, but the pitch P[n2] may be below the pitch P[n1].

The signal generator 72 generates a transition interval Xt within the audio signal V using the waveform signals W[n1] and W[n2]. Specifically, the transition interval Xt within the audio signal V is generated by crossfade of the waveform signals W[n1] and W[n2] as well as by control of transition from the pitch P[n1] to the pitch P[n2]. The generation of the transition interval Xt will be described below.

The signal generator 72 decreases the volume of the waveform signal W[n1] over time from the start point TS to the end point TE of the transition interval Xt. The volume of the waveform signal W[n1] decreases continuously within the transition interval Xt. Specifically, the signal generator 72 multiplies the waveform signal W[n1] by a coefficient (gain). This coefficient decreases over time from the maximum "1" to the minimum "0" during a period from the start point TS to the end point TE. Furthermore, the signal generator 72 increases the volume of the waveform signal W[n2] over time from the start point TS to the end point TE of the transition interval Xt. As a result, the volume of the waveform signal W[n2] increases continuously within the transition interval Xt. The signal generator 72 multiplies the waveform signal W[n2] by a coefficient (gain). This coefficient increases over time from the minimum "0" to the maximum "1" during a period from the start point TS to the end point TE.

Furthermore, the signal generator 72 changes the pitch of the waveform signal W[n1] over time from the start point TS to the end point TE of the transition interval Xt. Specifically, the signal generator 72 changes the pitch of the waveform signal W[n1] over time from the pitch P[n1] to the pitch P[n2] during a period from the start point TS to the end point TE. The pitch of the waveform signal W[n1] rises or falls from the pitch P[n1] at the start point TS, and it reaches the pitch P[n2] at the end point TE. Furthermore, the signal generator 72 changes the pitch of the waveform signal W [n2] over time from the start point TS to the end point TE of the transition interval Xt. Specifically, the signal generator 72 changes the pitch of the waveform signal W[n2] over time from the pitch P[n1] to the pitch P[n2] during a period from the start point TS to the end point TE. The pitch of the waveform signal W[n2] rises or falls from the pitch P[n1] at the start point TS, and it reaches the pitch P[n2] at the end point TE, in a manner similar to that of the waveform signal W[n1].

The signal generator 72 generates a transition interval Xt within the audio signal V by adding the waveform signal W[n1] to the waveform signal W[n2], to which processing described above has been applied. As a result, the transition interval Xt is generated by the crossfade of the waveform signals W[n1] and W[n2]. The pitch within the transition interval Xt shifts from the pitch P[n1] of the first sound to the pitch P[n2] of the second sound. As will be apparent from the foregoing description, in the transition interval Xt, sound represented by the audio signal V changes from the first sound to the second sound over time. The user can apply musical effects equivalent to legato or portamento to sounds to be output by the sound output device 40 by a manipulation of the key K[n2] during a manipulation of the other key K[n1].

The generation controller 73 shown in FIG. 4 controls generation of an audio signal V by the signal generator 72. In the first embodiment, the generation controller 73 controls a time length T of the transition interval Xt. Specifically, by the generation controller 73, the time length T of the transition interval Xt is controlled based on a reference position Zref in the continuous manipulation between the keys K[n1] and K[n2]. Here, the reference position Zref refers to the position Z[n1] of the key K[n1] at the time point Ton of the manipulation of the key K[n2]. As shown in FIG. 6, at the time point Ton, the position Z[n2] of the key K[n2] reaches the manipulation position Zon in response the depression of the key K[n2]. The position Z[n1] of the key K[n1] at this time point Ton is the reference position Zref. When attention is paid to the distance L between the upper end position ZH and the reference position Zref, the generation controller 73 controls the time length T of the transition interval Xt based on the distance L. The distance L refers to an amount of a user manipulation of the key K[n].

Figure 7:
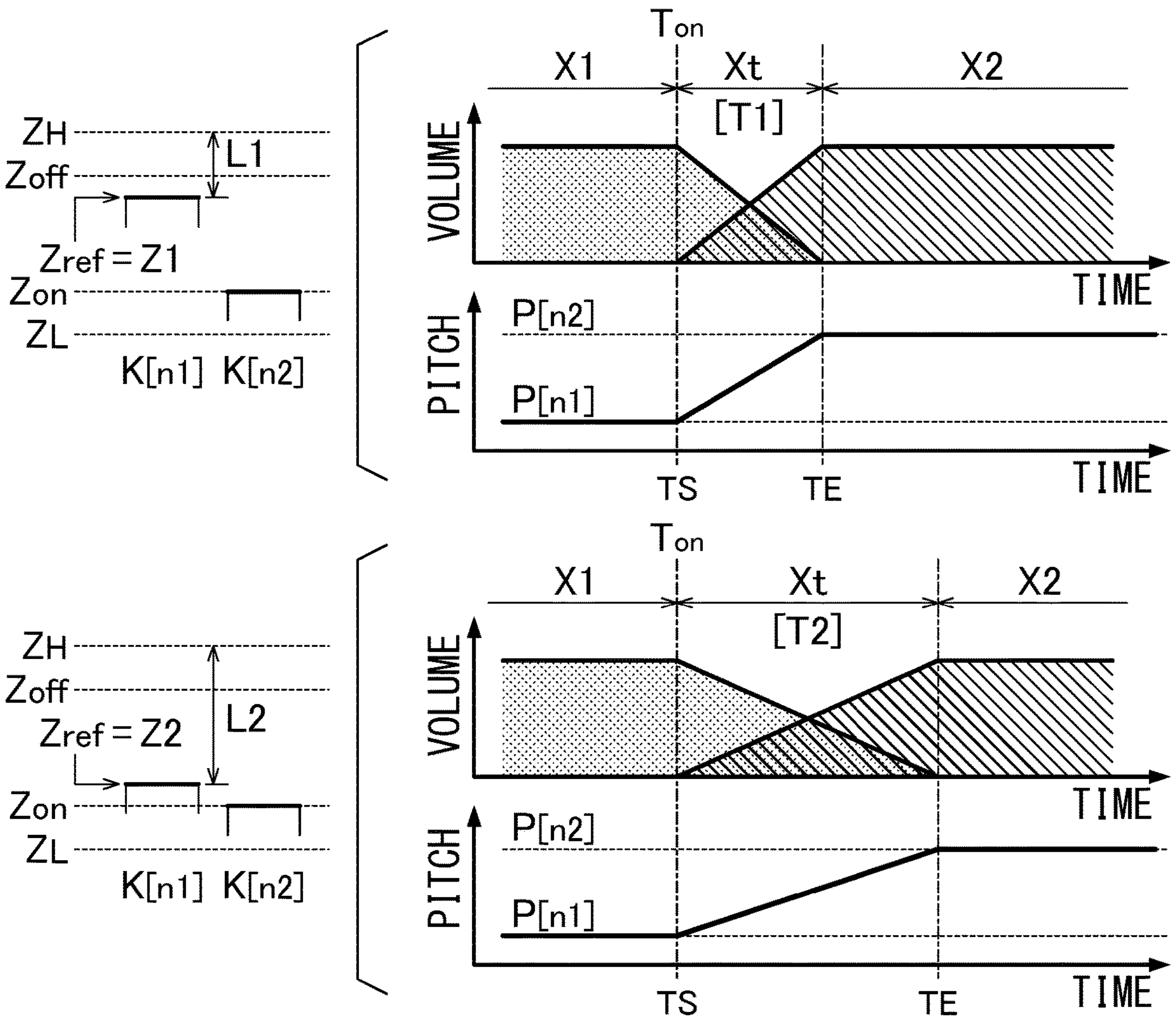
FIG. 7 shows a relationship between a reference position and the time length of a transition interval.

FIG. 7 shows a relationship between the reference position Zref and the time length T. In FIG. 7, the positions Z1 and Z2 within the movable range Q are examples of the reference position Zref. The position Z2 is closer to the lower end position ZL than the position Z1. That is, the distance L2 between the position Z2 and the upper end position ZH exceeds the distance L1 between the position Z1 and the upper end position ZH (L2>L1). The position Z1 is an example of a "first position." The position Z2 is an example of a "second position."

When the reference position Zref is the position Z1, the generation controller 73 sets the transition interval Xt to the time length T1. When the reference position Zref is the position Z2, the generation controller 73 sets the transition interval Xt to the time length T2. The time length T2 is longer than the time length T1 (T2>T1). As will be apparent from the above description, the generation controller 73 controls the time length T of the transition interval Xt such that the closer the reference position Zref is to the lower end position ZL, the longer the time length T of the transition interval Xt increases. The longer distance L between the upper end position ZH and the reference position Zref increases the time length T of the transition interval Xt.

Figure 8:
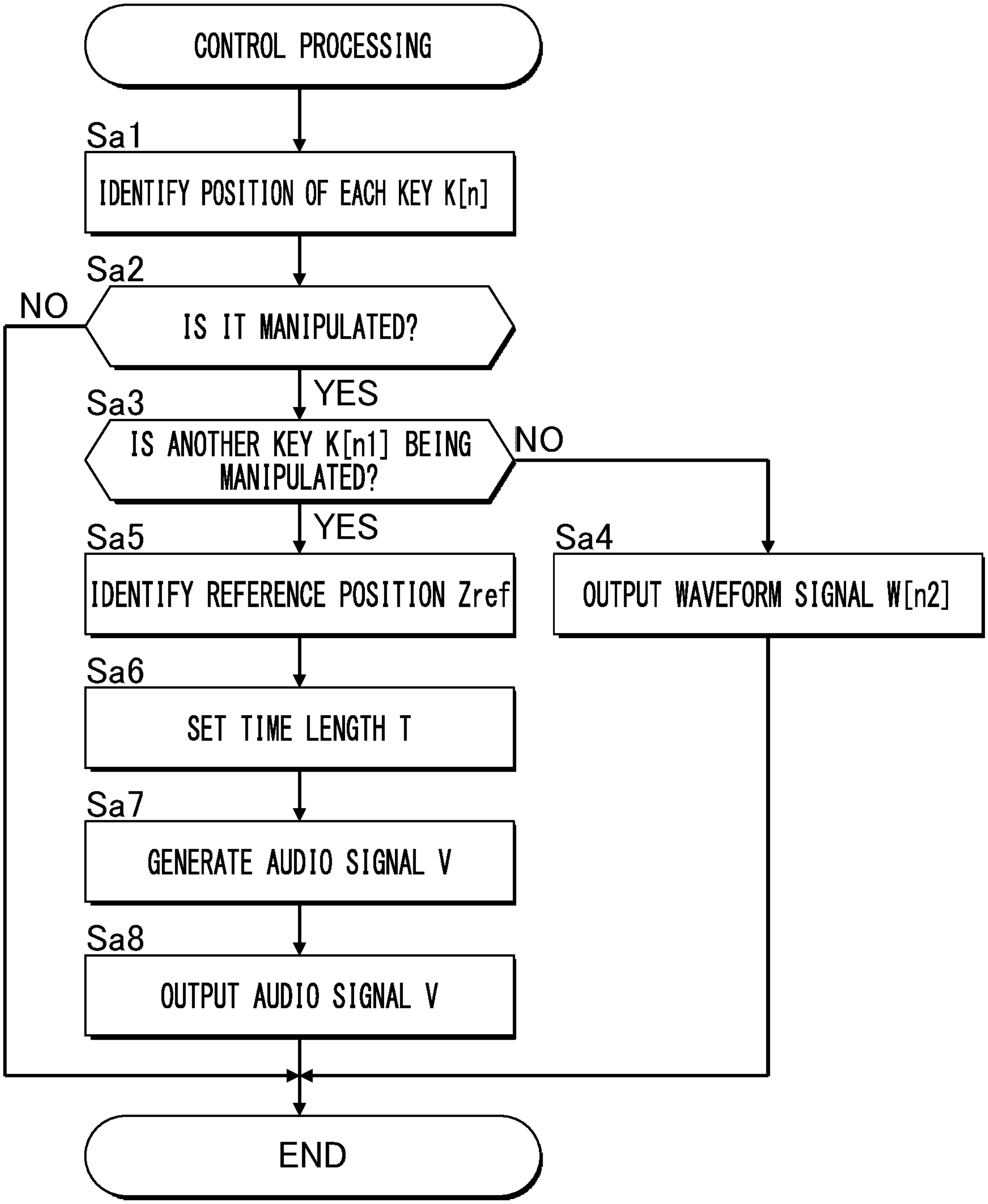
FIG. 8 is a flowchart of an example of control processing.

FIG. 8 is a flowchart of an example of the detailed procedure of the controller 31 (hereafter, "control processing"). In one example, steps shown in FIG. 8 are repeated at a predetermined cycle.

When the control processing has started, the controller 31 (position identifier 71) to analyze a detection signal D to identify a position Z[n] of each of the keys K[n] (Sa1). The controller 31 (signal generator 72) refers to the position Z[n] of each key K[n] to determine whether any of the N keys K[1] to K[N] (e.g., key K[n2]) has been manipulated (Sa2). Specifically, the controller 31 determines whether the position Z[n2] has reached the manipulation position Zon in response to the depression of the key K[n2].

When it is determined that the key K[n2] has been manipulated (Sa2: YES), the controller 31 (signal generator 72) determines whether the other key K[n1] is being manipulated (Sa3). If no other key K[n1] is being manipulated (Sa3: NO), the key K[n2] is being manipulated alone. The controller 31 outputs a waveform signal W[n2], which is as an audio signal V, to the sound output device 40 (Sa4). As a result, the second sound with the pitch P[n2] is produced by the sound output device 40.

When the key K[n2] is manipulated during the manipulation of the key K[n1] (Sa3: YES), that is, during the continuous manipulation, the controller 31 (signal generator 72) generates an audio signal V using the waveform signal W[n1] corresponding to the key K[n1] and the waveform signal W[n2] corresponding to the key K[n2] (Sa5-Sa7).

First, the controller 31 (generation controller 73) identifies a reference position Zref, which is the position Z[n1] of the key K[n1] at the time point Ton of the manipulation of the key K[n2] (Sa5). Furthermore, the controller 31 (generation controller 73) sets the time length T of the transition interval Xt based on the identified reference position Zref (Sa6). Specifically, the controller 31 sets the time length T of the transition interval Xt such that the closer the reference position Zref is to the lower end position ZL, the more the time length T increases. The controller 31 (signal generator 72) generates an audio signal V by crossfade of the waveform signals W[n1] and W [n2] within the transition interval Xt with the time length T (Sa7). The controller 31 (signal generator 72) outputs, to the sound output device 40, the audio signal V generated by the foregoing processing to (Sa8). Such a control processing is repeated periodically.

In this first embodiment, when the key K[n2] is manipulated during the manipulation of the key K[n1], generation of the audio signal V is controlled based on the reference position Zref. The reference position Zref is the position of the key K[n1] at the time point Ton of the manipulation of the key K[n2]. Such simple processing to identify a position Z[n1](=Zref) of the key K[n1] at the time point Ton of the user manipulation of the key K[n2] enables an audio signal V with a variety of audio characteristics to be generated based on the user manipulation. Specifically, in this first embodiment, the time length T of the transition interval Xt, in which the sound represented by the audio signal V transitions from the first sound (pitch P[n1]) to the second sound (pitch P[n2]), is controlled based on the reference position Zref. As a result, a variety of audio signals V can be generated, in which the time length T of the transition interval Xt changes in response to the user manipulations of the keys K[n1] and K[n2].

A user attempt of quick transition from the first sound to the second sound tends to make the time length of overlapping manipulation periods of the keys K[n1] and K[n2] shorter. Alternatively, a user attempt of gradual transition of the first sound to the second sound tends to make that time length longer. In this first embodiment, when the reference position Zref is at a position Z2 closer to the lower end position ZL than the position Z1, the transition interval Xt is set to the time length T2 longer than the time length T1. As a result, it is easy for the user to set the transition interval Xt to the desired time length T with simple manipulations.

B: Second Embodiment

The second embodiment will be described. In each of the embodiments described below, like reference signs are used for elements having functions or effects identical to those of elements described in the first embodiment, and detailed explanations of such elements are omitted as appropriate.

Figure 9:
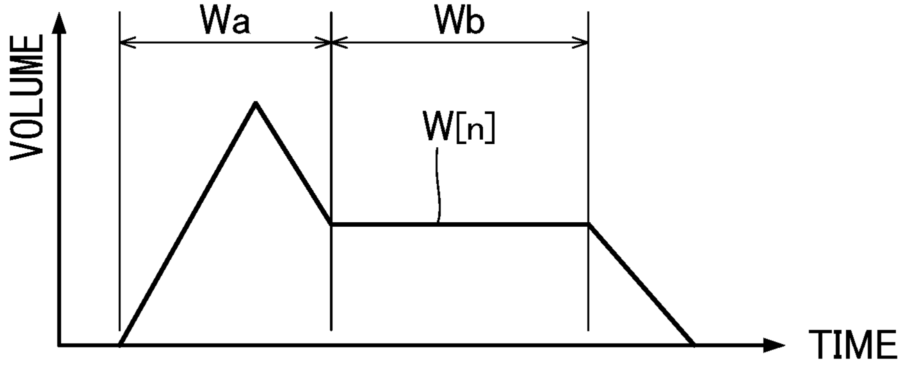
FIG. 9 is a schematic diagram of a waveform signal.

FIG. 9 is a schematic diagram of a waveform signal W[n]. The waveform signal W[n] includes an onset part Wa and an offset part Wb. The onset part Wa is a period that comes immediately after output of sound indicated by the waveform signal W[n] has started. In one example, the onset part Wa includes an attack period in which the volume of the sound indicated by the waveform signal W[n] rises, and a decay period in which the volume decreases immediately after the attack period. The offset part Wb is a period that comes after (follows) the onset part Wa. In one example, the offset part Wb corresponds to a sustain period during which the volume of the sound indicated by the waveform signal W[n] is constantly maintained.

When the key K[n] is manipulated alone, the signal generator 72 generates an audio signal V using the entirety of the waveform signal W[n]. That is, the signal generator 72 supplies the sound output device 40 with the entirety of the waveform signal W[n], which is as an audio signal V and includes the onset part Wa and the offset part Wb. As a result, sound including both the onset part Wa and the offset part Wb is produced by the sound output device 40.

Figure 10:
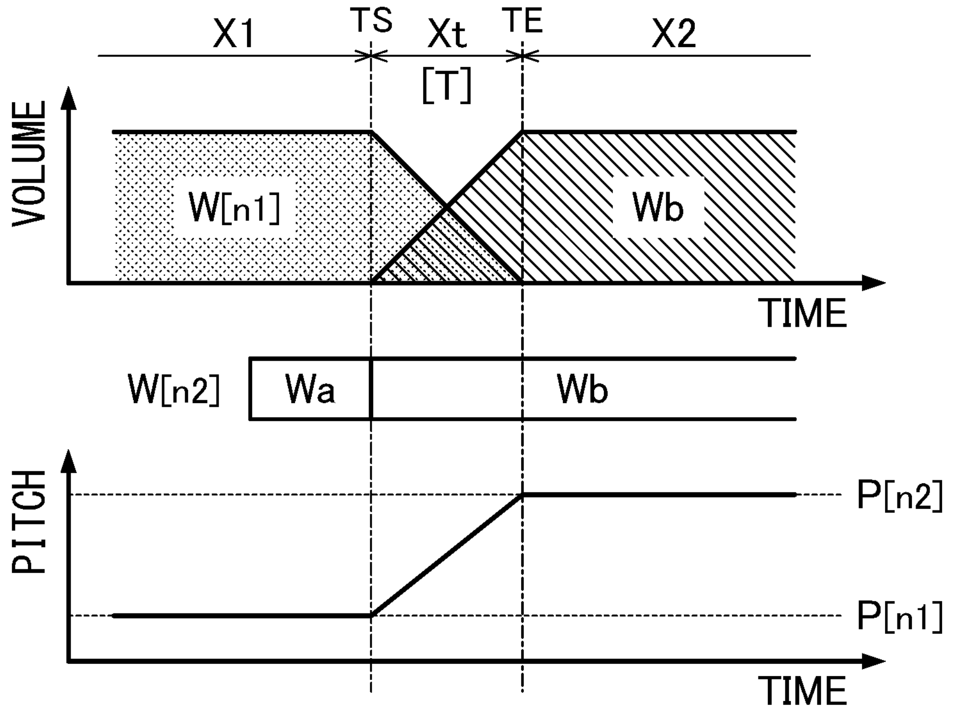
FIG. 10 shows actions of a signal generator according to a second embodiment.

During the continuous manipulation, that is, when the key K[n2] is manipulated during the manipulation of the key K[n1], the signal generator 72 generates an audio signal V by using the offset part Wb within the waveform signal W[n2]. Specifically, during the transition interval Xt shown in FIG. 10, the offset part Wb within the waveform signal W[n2] except the onset part Wa is crossfaded to the former waveform signal W[n1] to generate the audio signal V. The onset part Wa within the waveform signal W[n2] is not used to generate the audio signal V. The configuration and procedures of the electronic musical instrument are identical to those in the first embodiment. However, the onset part Wa within the waveform signal W[n2] is not used during the continuous manipulation. The same effects as those in the first embodiment are obtained from this second embodiment.

In the first embodiment, the onset part Wa within the waveform signal W[n2] is used to generate an audio signal V during the continuous manipulation. In this configuration, the user can clearly hear and know the onset part Wa of the second sound within the transition interval Xt. That is, the user can clearly hear and know when the first sound started to follow the independent second sound. On the other hand, the user may not have the sufficient impression of the first sound continuously transitioned to the second sound. In this second embodiment, however, the onset part Wa is not used for the second sound following the first sound. As a result, it is possible to generate an audio signal V in which the first and second sounds are connected to each other smoothly.

It is noted that, in the first embodiment, the onset part Wa within the waveform signal W[n2] is used for an audio signal V, but the volume of the waveform signal W[n2] is suppressed when the crossfade is carried out within the transition interval Xt. As a result, it may be difficult for the user to hear the onset part Wa depending on the waveform thereof. Compared to this second embodiment, in the first embodiment, the onset part Wa within the waveform signal W[n2] is not excluded to generate the audio signal V, and therefore processing load in the controller 31 is reduced.

C: Third Embodiment

Figure 11:
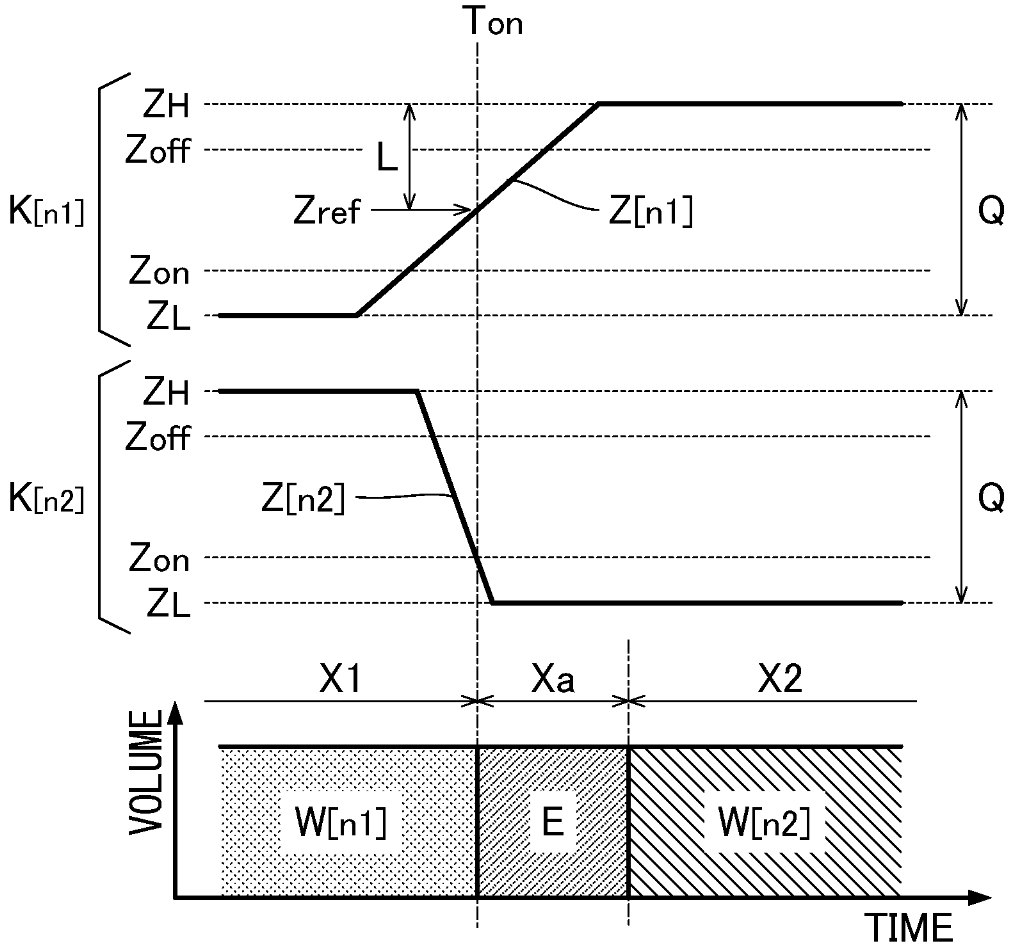
FIG. 11 shows actions of a signal generator according to a third embodiment.

FIG. 11 shows how the signal generator 72 acts according to the third embodiment during the continuous manipulation. In a manner similar to the first embodiment, the key K[n2] is manipulated during the manipulation of the key K[n1]. In this case, the signal generator 72 generates an audio signal V that includes a first interval X1, a second interval X2 and an additional interval Xa. When the key K[n] is manipulated alone, the waveform signal W[n] is output as the audio signal V. In this regard, this third embodiment is identical to that in the first embodiment.

In a manner similar to the first embodiment, in the first interval X1, the signal generator 72 supplies the sound output device 40 with a waveform signal W[n1], which is as an audio signal V and corresponds to the key K[n1]. In the second interval X2, the signal generator 72 supplies the sound output device 40 with a waveform signal W[n2], which is as an audio signal V and corresponds to the key K[n2]. In this third embodiment, the waveform signal W[n2], which is as an audio signal V and includes both the onset part Wa and the offset part Wb, is supplied to the sound output device 40 from the start point of the second interval X2. As a result, the start of the onset part Wa within the waveform signal W[n2] is produced from the start of the second interval X2. However, in a manner similar to the second embodiment, production of the onset part Wa within the waveform signal W[n2] may be omitted.

The signal generator 72 supplies the sound output device 40 with an additional signal E in response to the additional interval Xa within the audio signal V. The additional signal E represents an additional sound effect that is independent from the first and second sounds. Specifically, the additional sound is caused by the performance of musical instruments, that is, it is sound other than sound generated by the original musical instruments. Examples of the additional sound include finger noise (fret noise) caused by friction between the fingers and the strings when playing a string musical instrument, and breath sound when playing a wind musical instrument or singing. As will be apparent from the above description, the additional sound between the first and second sounds is produced by the sound output device 40.

The generation controller 73 according to this third embodiment controls audio characteristics of the additional sound within the additional interval Xa based on the reference position Zref. Specifically, the volume of the additional sound is controlled based on the reference position Zref by the generation controller 73. In one example, the closer the reference position Zref is to the lower end position ZL, the greater the volume of the additional sound increases. When the positions Z1 and Z2 are the reference positions Zref in a manner similar to the first embodiment, the volume of the additional sound in the reference position Zref being the position Z2 exceeds that in the reference position Zref being the position Z1. That is, the longer the distance L between the upper end position ZH and the reference position Zref, the greater the volume of the additional sound. Instead of this example, it may be that the greater the distance L between the upper end position ZH and the reference position Zref, the lower the volume of the additional sound.

Figure 12:
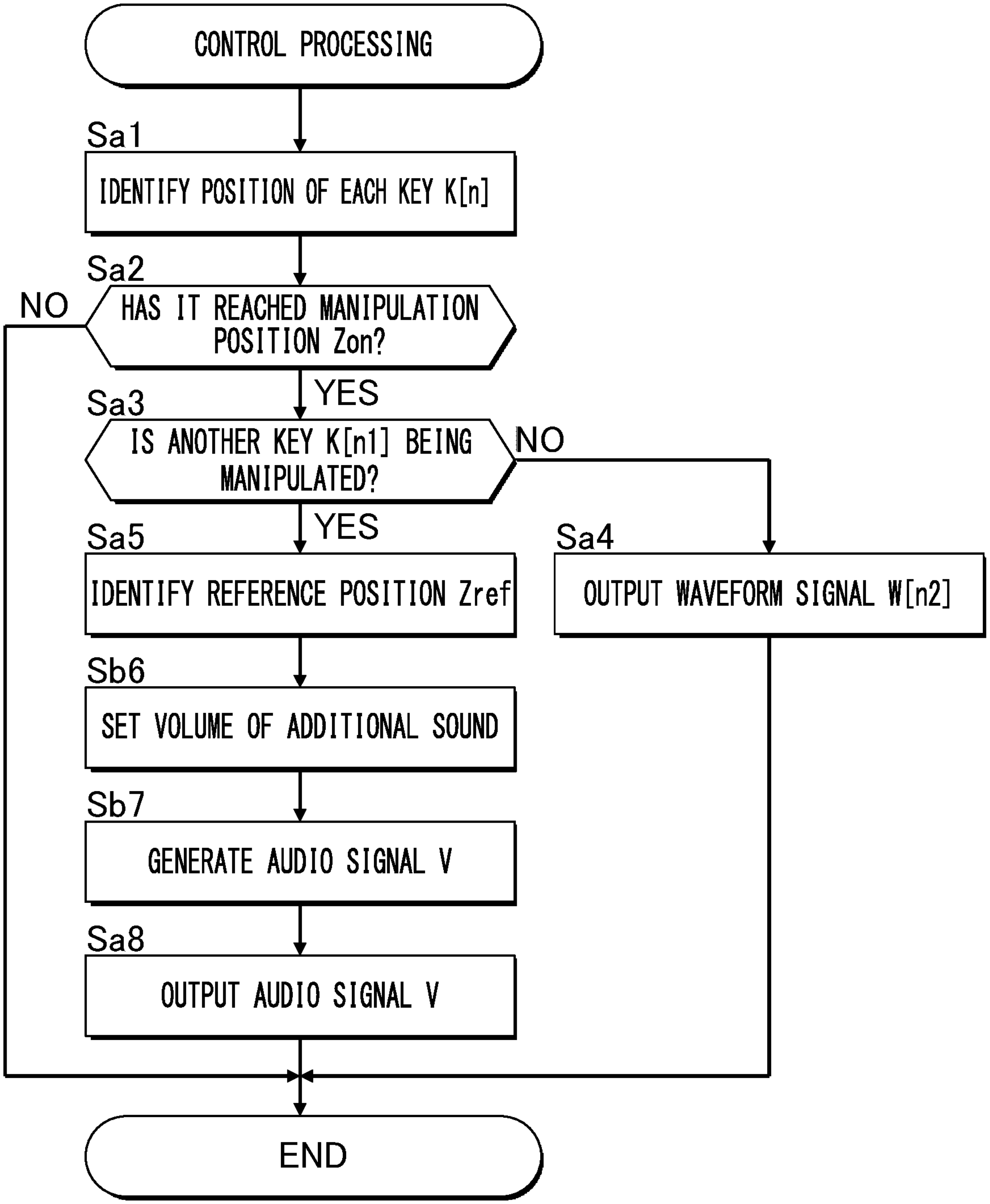
FIG. 12 is a flowchart of the detailed procedures of control processing according to the third embodiment.

FIG. 12 is a flowchart of the detailed procedures of control processing according to the third embodiment. In this third embodiment, the steps Sa6 and Sa7 in the control processing according to the first embodiment are replaced by steps Sb6 and Sb7 shown in FIG. 12, respectively. The processing other than the steps Sb6 and Sb7 is identical to those in the first embodiment.

After identifying the reference position Zref (Sa5), the controller 31 (generation controller 73) acquires an additional signal E from the storage device 32 to set the volume thereof based on the reference position Zref (Sb6). Then, the controller 31 (signal generator 72) generate the additional signal E with the adjusted volume, which is as an audio signal V, in response to an additional interval Xa (Sb7). The controller 31 (signal generator 72) outputs the audio signal V to the sound output device 40 (Sa8), in a manner similar to the first embodiment. Such control processing is repeated periodically.

In this third embodiment, when the key K[n2] is manipulated during the manipulation of the key K[n1], generation of the audio signal V is controlled based on the reference position Zref, which is the position of the key K[n1] at the time point Ton of the manipulation of the key K[n2]. In a manner similar to the first embodiment, the position Z[n1] (=Zref) of the key K[n1] at the time point Ton of the manipulation of the key K[n2] is identified. By this simple processing, an audio signal V with a variety of audio characteristics can be generated based on the user manipulation. Furthermore, in this third embodiment, a variety of audio signals V. For example, an additional sound with audio characteristics based on the reference position Zref is produced between the first and second sounds.

In the first and second embodiments, for example, the time length T of the transition interval Xt is controlled based on the reference position Zref. In this third embodiment, for example, the audio characteristics of an ambient sound during the additional interval Xa are controlled based on the reference position Zref. Thus, in these first to third embodiments, generation of an audio signal V is controlled based on the reference position Zref by the generation controller 73.

D: Modifications

Specific modifications added to each of the aspects described above are described below. Two or more modes selected from the following descriptions may be combined with one another as appropriate as long as such combination does not give rise to any conflict.

(1) In the first and second embodiments, for example, the pitch of an audio signal V changes during the transition interval Xt, but such audio characteristics are not limited to pitches. In one example, the volume of the audio signal V may change from a first volume of the first sound to a second volume of the second sound during the transition interval Xt. In this case, the first volume of the first sound is set based on the speed of movement of the key K[n1] (i.e., the rate of change in the position Z[n1]). The second volume of the second sound is set based on the speed of movement of the key K[n2]. Alternatively, the timbre of the audio signal V may transition from a first timbre of the first sound to a second timbre of the second sound during the transition interval Xt. The first and second sounds have different timbres. Furthermore, the first and second sounds may have different frequency responses.

As described in the first and second embodiments, the transition interval Xt is set between the first and second intervals X1 and X2, the time length T of the transition interval Xt is controlled based on the reference position Zref. The transition interval Xt is expressed as an interval in which the sound indicated by the audio signal V transitions from the first sound to the second sound. The first and second sounds are expressed as sounds with different audio characteristics.

(2) In the third embodiment, the volume of an additional sound during the additional interval Xa is controlled based on the reference position Zref. However, such audio characteristics of the additional sound are not limited to the volume. The pitch or timbre (frequency response) of the additional sound may be controlled based on the reference position Zref. Two or more audio characteristics of the additional sound may be controlled based on the reference position Zref.

The signal generator 72 may use any of additional signals E representative of different additional sounds in response to the addition interval Xa within an audio signal V. In this case, for example, the additional signals E are stored in the storage device 32, and each represents a different kind of additional sound. In this embodiment, from among the additional signals E, the signal generator 72 may select any one based on the reference position Zref. The additional signal E used as the additional interval Xa within the audio signal V is updated based on the reference position Zref.

(3) In the first and second embodiments, for example, the time length T of the transition interval Xt is controlled based on the reference position Zref. In the third embodiment, for example, audio characteristics of an additional sound during the additional interval Xa are controlled based on the reference position Zref. Although the reference position Zref is reflected in generation of an audio signal V by the signal generator 72, it is not limited to such an example. In a case in which the signal generator 72 generates an audio signal V to which various sound effects are imparted, the generation controller 73 may control variables related to the sound effects based on the reference position Zref. Examples of the sound effects imparted to the audio signal V include reverb, overdrive, distortion, compressor, equalizer and delay. This embodiment is another example in which the generation controller 73 controls the generation of the audio signal V based on the reference position Zref.

(4) In the foregoing embodiments, an audio signal V is generated by selectively using N waveform signals W[1] to W[N] that corresponds to the respective different keys K[n]. However, the configuration and method for generating the audio signal V are not limited to such an example. The signal generator 72 may generate an audio signal V by modulation processing that modulates the basic signal stored in the storage device 32. The basic signal is a cyclic signal the level of which changes at a predetermined frequency. The first interval X1 and the second interval X2 within the audio signal V are continuously generated by the modulation processing, and thus the crossfade according to the first and second embodiments is no longer necessary. The signal generator 72 may control the conditions of the modulation processing related to the basic signal, to change the audio characteristics (e.g., volume, pitch, or timbre) of the audio signal V during the transition interval Xt.

Figure 13:
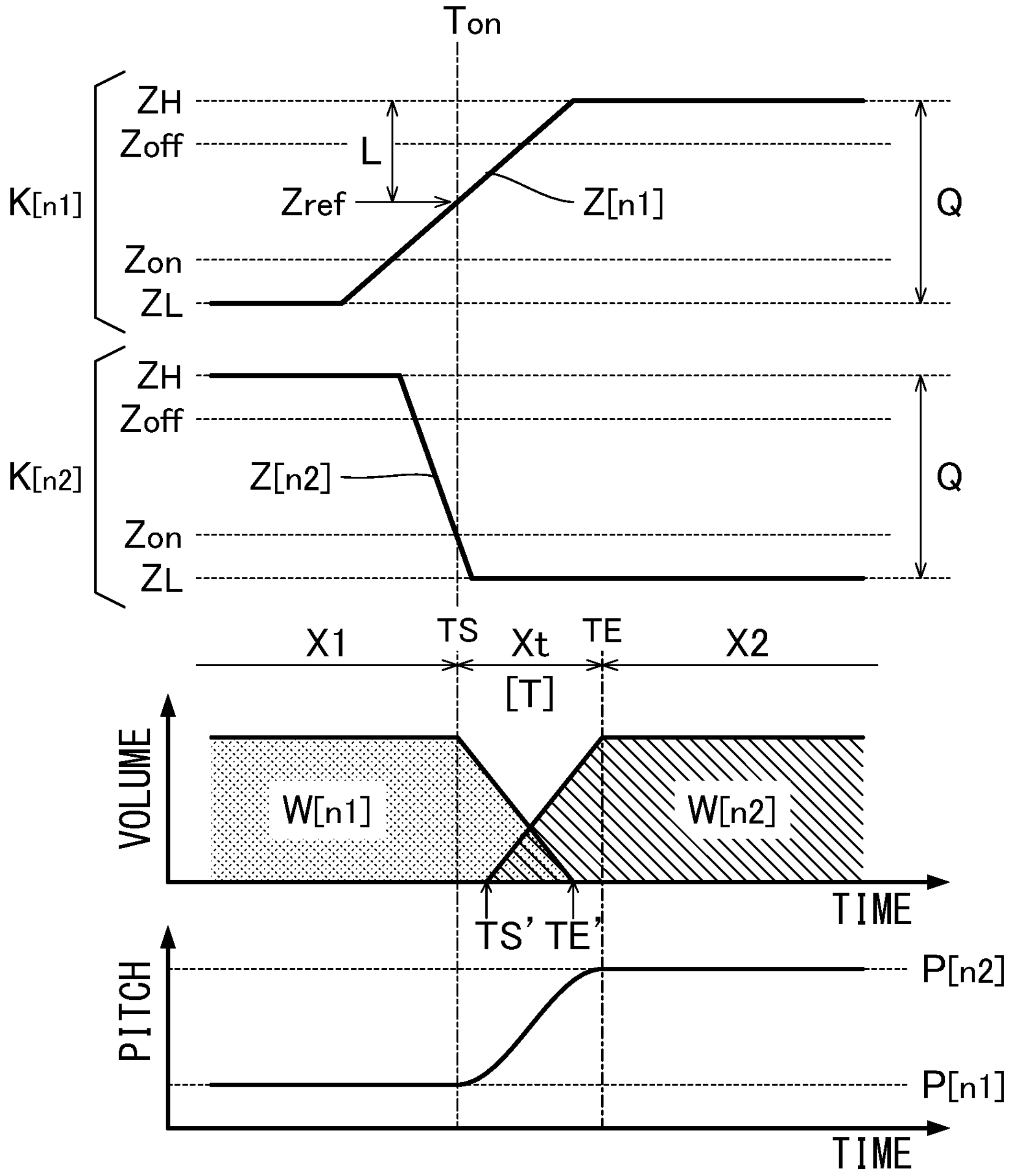
FIG. 13 shows actions of a signal generator according to a modification.

(5) In the foregoing embodiments, the volume of each of the waveform signals W[n1] and W[n2] changes over time from the start point TS to the end point TE of the transition interval Xt. However, the interval for controlling the volume thereof may be a part of the transition interval Xt. In this case, as shown in FIG. 13, the signal generator 72 decreases the volume of the waveform signal W[n1] over time from the start point TS of the transition interval Xt to the time point TE'. The time point TE' refers to a time point that has not yet reached the end point TE. Furthermore, the signal generator 72 increases the volume of the waveform signal W[n2] over time from the time point TS' to the end point TE. The time point TS' refers to a time point that has passed after the start time point tS of the transition interval Xt. The waveform signals W[n1] and W[n2] are mixed together during a period from the time point TS' to the time point TE'.

In the foregoing embodiments, the pitch of an audio signal V changes linearly within the transition interval Xt. However, the conditions for changing the audio characteristics of the audio signal V are not limited to such an example. As shown in FIG. 13, the signal generator 72 may non-linearly change the pitch of the audio signal V from the pitch P[n1] to the pitch P[n2] within the transition interval Xt. The audio characteristics of the audio signal V may change gradually within the transition interval Xt.

(6) In the foregoing embodiments, the position Z[n] of each key K[n] is detected by a corresponding magnetic sensor 21. However, the configuration and method for detecting the position Z[n] of each key K[n] are not limited to such an example. A variety of sensors may be used to detect the position Z[n] of each key K[n]. Examples of such sensors include an optical sensor that is detectable for the position Z[n] based on an amount of reflected light from the corresponding key K[n], and a pressure sensor that is detectable for the position Z[n] based on change in pressing force by the corresponding key K[n].

(7) In the foregoing embodiments, an example is give of the keys K[n] of the keyboard 10. However, operational elements to be manipulated by the user are not limited to such keys K[n]. Examples of the operational elements include a foot pedal, a valve on a brass instrument (e.g., trumpet, and trombone), and a key on a woodwind instrument (e.g., clarinet, and saxophone). As will be clear from these examples, the operational elements in this disclosure may be various elements to be manipulated by the user. In one example, virtual operational elements for a user manipulation to be displayed on a touch panel are included in the concept of "operation elements" in this disclosure. Although the foregoing operational elements are movable within a predetermined area in response to user manipulations, the movements thereof are not limited to be linear. Other examples of the "operational elements" include a rotary operational element (e.g., control knob) rotatable in response to a user manipulation. The "position" of the rotary operational element is intended to be a rotation angle relative to the normal position (normal condition).

(8) The function of the signal generation system 30 is implemented by the cooperation of one or more processors comprising the controller 31 and the program stored in the storage device 32. The program can be provided in the form of a computer readable recording medium, and it can be installed on a computer system. The recording medium is, for example, a non-transitory recording medium, such as a CD-ROM or other optical recording medium (optical disk). The recording medium is any known type of recording medium, such as a semiconductor recording medium and a magnetic recording medium. The non-transitory recording media is any recording media, except for transient propagation signals (transitory, propagating signal). The non-transitory recording media may be a volatile recording media. Furthermore, in a case in which the program is distributed by a distribution device through a network, the recording medium on which the program is stored in the distribution device is equivalent to the non-transitory recording medium.

E: Appendices

The following configurations are derivable from the foregoing embodiments.

A signal generation method according to an aspect (Aspect 1) of this disclosure is a signal generation method implemented by a computer system, including: generating an audio signal in response to a manipulation of each of a first operational element and a second operational element; and controlling generation of the audio signal based on a reference point that is a position of the first operational element at a time point of a manipulation of the second operational element, based on the second operational element being manipulated during a manipulation of the first operational element.

In this aspect, the generation of the audio signal is controlled based on the position of the first operational element (reference position) at the time of the manipulation of the second operational element. Such simple processing to identify a position of the first operation element at the time point of the manipulation of the second operational element enables an audio signal with a variety of audio characteristics to be generated based on the manipulation.

The "audio signal" is a signal representative of sound and is generated in response to a manipulation. The relationship between the manipulation of the operational elements and the audio signal may be freely selected. For example, sound represented by the audio signal may be output or silenced in conjunction with the manipulations of the operational elements, or the audio characteristics of the audio signal change in conjunction with the manipulation of the operational elements. The audio characteristics of the audio signal may be a volume, a pitch, or a timbre (i.e., frequency response).

In one example, the expression "based on the second operational element being manipulated during a manipulation of the first operational element" is equivalent to a case in which a manipulation period of the first operational element and a manipulation period of the second operational element overlap each other on the time axis. Specifically, the manipulation period of the first operational element includes an end period with the end, and the manipulation period of the second operational element includes a start period with the start point. The "manipulation period" of each operational element refers to a period during which an operational element to the subject is being manipulated. For example, the "manipulation period" is equivalent to a period from a time point at which it is determined that the operational element to be the subject has been manipulated to a time point at which it is determined that the manipulation of the operational element has been released. In one example, the manipulation position and the release position are within the movable range of an operational element to be subjected. The manipulation position refers to a position at which it is determined that the operational element has been manipulated. The release position refers to a position at which it is determined that the manipulation of the operational element has been released. The manipulation period refers to a period during which the operational element reaches the manipulation position until it reaches the release position. The relationship between the manipulation position and the release position within the movable range is freely selected. The manipulation position and the release position may be different, or they may have the same position within the movable range.

The time point of the manipulation of the second operational element refers to a time point at which it is determined that the second operational element has been manipulated. Examples of the expression "the time point of the manipulation of the second operational element" include: (i) a time point at which, in response to a user manipulation, the second operational element begins to move from the position of the second operational element in a non-manipulation, and (ii) a time point at which the second operational element reaches a specific point within the movable range in response to a user manipulation.

The "position of the operational element" is intended to be a physical location of the operational element to be the subject in a case in which the operational element is movable in conjunction with a user manipulation. In this case, examples of the "position of the operational element" include a rotation angle of the rotated operational element, in this disclosure. The "position of the operational element" may be described as "amount of manipulation" of the operational element. In one example, the amount of manipulation refers to a distance or a rotation angle at which the operational element to be the subject has moved from the reference position after the user manipulation.

In a specific example of Aspect 1 (Aspect 2), the audio signal includes: a first interval representative of a first sound corresponding to the first operational element; a second interval representative of a second sound corresponding to the second operational element; and a transition interval between the first and second intervals, in which audio characteristics are transitioned from first audio characteristics of the first sound to second audio characteristics of the second sound, and in which the method further includes controlling a time length of the transition interval based on the reference point.

In this aspect, the time length of the transition interval, in which the audio characteristics are transitioned from the first sound to the second sound, is controlled based on the position of the first operational element a time point of the manipulation of the second operational element. As a result, a variety of audio signals, for example, an audio signal in which the time length of the transition interval changes, can be generated based on manipulations of the first and second operational elements.

The "first sound" is produced in response to a manipulation of the first operational element. Similarly, the "second sound" is produced in response to a manipulation of the second operational element. The first and second sounds have different audio characteristics, such as a volume, a pitch, or a timbre (i.e., frequency response).

In a specific example of Aspect 1 (Aspect 4), the audio signal includes: a first interval representative of a first sound corresponding to the first operational element; a second interval representative of a second sound corresponding to the second operational element; and a transition interval between the first and second intervals, the transition interval being generated using a crossfade of: a first wave signal representative of the first sound; and a second wave signal representative of the second sound, and in which the method further includes controlling a time length of the transition interval based on the reference point.

In this aspect, the time length of the transition interval is controlled based on the position of the first operational element at the time point of the manipulation of the second operational element. In the transition interval, the crossfade of the first waveform signal of the first sound and the second waveform signal of the second sound is carried out. As a result, a variety of audio signals, for example, an audio signal in which the time length of the transition interval changes, can be generated based on the user manipulation of the first and second operational elements.

The expression "crossfade of the first and second waveform signals" refers to a processing in which the first and second waveform signals are mixed together with decreasing the volume of the first waveform signal (first sound) over time, and with increasing the volume of the second waveform signal (second sound) over time. This crossfade is also expressed as crossfade of the first and second sounds.

In a specific example of Aspect 4 (Aspect 5), the second wave signal includes: an onset part that comes immediately after a start of the second sound; and an offset part that follows the onset part, in which the method further includes: generating the second wave signal based on the second operational element being manipulated alone, using the second wave signal; and using the offset part within the second wave signal during the crossfade.

In this aspect, the offset part of the second waveform signal is used for the crossfade. As a result, it is possible to generate an audio signal V in which the first and second sounds are connected to each other smoothly.

In a specific examples according to Aspect 1 (Aspect 3), each of the first and second operational elements is movable between: a first end position in a non-manipulation state; and a second end position apart from the first end position, the transition interval is set to a first time length, in response to the reference point being at a first position; and the transition interval is set to a second time length longer than the first time length, in response to the reference point being at a second position closer to the second end position than the first position.

A user attempt of quick transition from the first sound to the second sound tends to make the time length of overlapping a manipulation period of the first and second operational elements shorter. Alternatively, a user attempt of gradual transition from the first sound to the second sound tends to make that time length longer. In this aspect, when the reference position is at the second position closer to the second end position than the first position, the transition interval is set to the second time length longer than the first time length. For example, the closer the reference position is to the second end position, the longer the time length of the transition interval increases. As a result, it is easy for the user to set the transition interval to the desired time length with simple manipulations.

The "non-manipulation state" refers to a state in which no user manipulation is made to an operational element to be subjected. The "first end position" refers to a position of the operational element in the non-manipulation state. The "second end position" refers to a position of the operational element that has been manipulated by the user. Specifically, the second end position refers to the maximum allowable position of the operational element. The "first end position" is a position of one end within the movable range of the operational element. The "second end position" is a position of the other end within the movable range.

In a specific example according to Aspect 1 (Aspect 6), the audio signal includes: a first interval representative of a first sound corresponding to the first operational element; a second interval representative of a second sound corresponding to the second operational element; and an additional interval representative of an output of additional sound between the first and second intervals, and in which the method further includes controlling audio characteristics of the additional sound based on the reference point.

In this aspect, a variety of audio signals, for example, an audio signals in which additional sound with audio characteristics is produced based on the reference position, can be generated.

The "additional sound" refers to an additional sound effect that is independent from the first or second sounds. For example, the additional sound is caused by the performance of musical instruments, that is, it is sound other than sound generated by the original musical instruments. Examples of the additional sound include finger noise (fret noise) caused by friction between the fingers and the strings when playing a string musical instrument, and breath sound when playing a wind musical instrument or singing.

In a specific example (Aspect 7) according to any one of Aspects 1 to 6, a first manipulation period of the first operational element and a second manipulation period of the second operation element overlap each other on a time axis. The first and second operational elements are keys of a keyboard.

In this aspect, an audio signal with a variety of audio characteristics can be simply generated based on user manipulations (i.e., depression of a key) when playing a musical keyboard instrument.

A signal generation system according to an aspect of this disclosure (Aspect 8) includes: at least one memory configured to store instructions; and at least one processor configured to implement the instructions to: generate an audio signal in response to a manipulation of each of a first key and a second key; and control generation of the audio signal based on a reference point that is a position of the first key at a time point of a manipulation of the second key, based on the second key being manipulated during a manipulation of the first key.

Aspects 2 to 7 are applied to the signal generation system according to Aspect 8.

An electronic musical instrument according to an aspect (Aspect 9) of this disclosure includes: a first key; a second key; a detection system configured to detect a manipulation of each of the first and second keys; and a signal generation system: in which the signal generation system includes: at least one memory configured to store instructions; and at least one processor configured to implement the instructions to: generate an audio signal in response to a manipulation of each of a first key and a second key; and control generation of the audio signal based on a reference point that is a position of the first key at a time point of a manipulation of the second key, based on the second key being manipulated during a manipulation of the first key.

A program according to an aspect (Aspect 10) of this disclosure is a non-transitory computer-readable recording medium storing a program executable by a computer system to execute a method including: generating an audio signal in response to a manipulation of each of a first key and a second key; and controlling generation of the audio signal based on a reference point that is a position of the first key at a time point of a manipulation of the second key, based on the second key being manipulated during a manipulation of the first key.

DESCRIPTION OF REFERENCES SIGNS

100: electronic musical instrument, 10: keyboard, 20: detection system, 21: magnetic sensor, 22: drive circuit, 30: signal generation system, 31: controller, 32: storage device, 33: A/D converter, 40: sound output device, 50: detection circuit, 60: detectable portion, 71: position identifier, 72: signal generator, 73: generation controller.

What is claimed is:

1. A signal generation method implemented by a computer system, the signal generation method comprising:

generating an audio signal in response to a manipulation of each of a first key and a second key; and controlling generation of the audio signal based on a distance between an upper end position of the first key within a movable range and a reference point that is a position of the first key at a time point of a manipulation of the second key, based on the second key being manipulated during a manipulation of the first key, wherein the upper end position of the first key is a position in a state in which the first key is not manipulated.

2. The signal generation method according to claim 1, wherein:

the audio signal includes:

a first interval representative of a first sound corresponding to the first key;

a second interval representative of a second sound corresponding to the second key; and a transition interval between the first and second intervals, in which audio characteristics are transitioned from first audio characteristics of the first sound to second audio characteristics of the second sound, and wherein the method further comprises controlling a time length of the transition interval based on the reference point.

3. The signal generation method according to claim 2, wherein:

each of the first and second keys is movable between:

a first end position in a non-manipulation state; and a second end position apart from the first end position, the transition interval is set to a first time length, in response to the reference point being at a first position, and the transition interval is set to a second time length longer than the first time length, in response to the reference point being at a second position closer to the second end position than the first position.

4. The signal generation method according to claim 1, wherein:

the audio signal includes:

a first interval representative of a first sound corresponding to the first key;

a second interval representative of a second sound corresponding to the second key; and a transition interval between the first and second intervals, the transition interval being generated using a crossfade of:

a first wave signal representative of the first sound; and a second wave signal representative of the second sound, and wherein the method further comprises controlling a time length of the transition interval based on the reference point.

5. The signal generation method according to claim 4, wherein:

the second wave signal includes:

an onset part that comes immediately after a start of the second sound; and an offset part that follows the onset part, wherein the method further comprises:

generating the second wave signal based on the second key being manipulated alone, using the second wave signal; and using the offset part within the second wave signal during the crossfade.

6. The signal generation method according to claim 1, wherein:

the audio signal includes:

a first interval representative of a first sound corresponding to the first key;

a second interval representative of a second sound corresponding to the second key; and an additional interval representative of an output of additional sound between the first and second intervals, and wherein the method further comprises controlling audio characteristics of the additional sound based on the reference point.

7. The signal generation method according to claim 1, wherein a first manipulation period of the first key and a second manipulation period of the second key overlap each other on a time axis.

8. A signal generation system comprising:

at least one memory configured to store instructions; and at least one processor configured to implement the instructions to:

generate an audio signal in response to a manipulation of each of a first key and a second key; and control generation of the audio signal based on a distance between an upper end position of the first key within a movable range and a reference point that is a position of the first key at a time point of a manipulation of the second key, based on the second key being manipulated during a manipulation of the first key, wherein the upper end position of the first key is a position in a state in which the first key is not manipulated.

9. The signal generation system according to claim 8, wherein:

the audio signal includes:

a first interval representative of a first sound corresponding to the first key;

a second interval representative of a second sound corresponding to the second key; and a transition interval between the first and second intervals, in which audio characteristics are transitioned from first audio characteristics of the first sound to second audio characteristics of the second sound, and the at least one processor is further configured to implement the instructions to control a time length of the transition interval based on the reference point.

10. The signal generation system according to claim 9, wherein:

each of the first and second keys is movable between:

a first end position in a non-manipulation state; and a second end position apart from the first end position, the at least one processor is further configured to implement the instructions to:

set the transition interval to a first time length, in response to the reference point being at a first position; and set the transition interval to a second time length longer than the first time length, in response to the reference point being at a second position closer to the second end position than the first position.

11. The signal generation system according to claim 9, wherein:

the audio signal includes:

a first interval representative of a first sound corresponding to the first key;

a second interval representative of a second sound corresponding to the second key; and an additional interval representative of an output of additional sound between the first and second intervals, and the at least one processor is further configured to implement the instructions to control audio characteristics of the additional sound based on the reference point.

12. The signal generation system according to claim 8, wherein:

the audio signal includes:

a first interval representative of a first sound corresponding to the first key;

a second interval representative of a second sound corresponding to the second key; and a transition interval between the first and second intervals, the transition interval being generated using a crossfade of:

a first wave signal representative of the first sound; and a second wave signal representative of the second sound, and the at least one processor is further configured to implement the instructions to control a time length of the transition interval based on the reference point.

13. The signal generation system according to claim 12, wherein:

the second wave signal includes:

an onset part that comes immediately after a start of the second sound; and an offset part that follows the onset part, and the at least one processor is further configured to implement the instructions to:

generate the second wave signal based on the second key being manipulated alone, using the second wave signal; and use the offset part within the second wave signal during the crossfade.

14. The signal generation system according to claim 8, wherein a first manipulation period of the first key and a second manipulation period of the second key overlap each other on a time axis.

15. An electronic musical instrument comprising:

a first key;

a second key;

a detection system configured to detect a manipulation of each of the first and second keys; and a signal generation system, wherein the signal generation system includes:

at least one memory configured to store instructions; and at least one processor configured to implement the instructions to:

generate an audio signal in response to a manipulation of each of a first key and a second key; and control generation of the audio signal based on a distance between an upper end position of the first key within a movable range and a reference point that is a position of the first key at a time point of a manipulation of the second key, based on the second key being manipulated during a manipulation of the first key, wherein the upper end position of the first key is a position in a state in which the first key is not manipulated.

16. A non-transitory computer-readable recording medium storing a program executable by a computer system to execute a method comprising:

generating an audio signal in response to a manipulation of each of a first key and a second key; and controlling generation of the audio signal based on a distance between an upper end position of the first key within a movable range and a reference point that is a position of the first key at a time point of a manipulation of the second key, based on the second key being manipulated during a manipulation of the first key, wherein the upper end position of the first key is a position in a state in which the first key is not manipulated.

17. The non-transitory computer-readable recording medium of claim 16, wherein:

the audio signal includes:

a first interval representative of a first sound corresponding to the first key;

a second interval representative of a second sound corresponding to the second key; and a transition interval between the first and second intervals, in which audio characteristics are transitioned from first audio characteristics of the first sound to second audio characteristics of the second sound, and wherein the method further comprises controlling a time length of the transition interval based on the reference point.

18. The non-transitory computer-readable recording medium of claim 17, wherein:

each of the first and second keys is movable between:

a first end position in a non-manipulation state; and a second end position apart from the first end position, the transition interval is set to a first time length, in response to the reference point being at a first position, and the transition interval is set to a second time length longer than the first time length, in response to the reference point being at a second position closer to the second end position than the first position.

19. The non-transitory computer-readable recording medium of claim 16, wherein:

the audio signal includes:

a first interval representative of a first sound corresponding to the first key;

a second interval representative of a second sound corresponding to the second key; and a transition interval between the first and second intervals, the transition interval being generated using a crossfade of:

a first wave signal representative of the first sound; and a second wave signal representative of the second sound, and wherein the method further comprises controlling a time length of the transition interval based on the reference point.

20. The non-transitory computer-readable recording medium of claim 19, wherein:

the second wave signal includes:

an onset part that comes immediately after a start of the second sound; and an offset part that follows the onset part, wherein the method further comprises:

generating the second wave signal based on the second key being manipulated alone, using the second wave signal; and using the offset part within the second wave signal during the crossfade.

* * * * *